United States Patent
May et al.

(10) Patent No.: US 6,694,407 B1
(45) Date of Patent: Feb. 17, 2004

(54) CACHE MEMORY WITH DATA TRANSFER CONTROL AND METHOD OF OPERATING SAME

(75) Inventors: Michael D. May, Clifton (GB); Hendrik L. Muller, Redland (GB)

(73) Assignee: Univerisity of Bristol, Bristol (GB)

( * ) Notice: Subject to any disclaimer, the term of this patent is extended or adjusted under 35 U.S.C. 154(b) by 0 days.

(21) Appl. No.: 09/890,153

(22) PCT Filed: Jan. 28, 2000

(86) PCT No.: PCT/GB00/00250
§ 371 (c)(1),
(2), (4) Date: Oct. 24, 2001

(87) PCT Pub. No.: WO00/45269
PCT Pub. Date: Aug. 3, 2000

(30) Foreign Application Priority Data

Jan. 28, 1999 (GB) ............................................. 9901933

(51) Int. Cl.[7] .............................................. G06F 12/00
(52) U.S. Cl. ...................... 711/129; 711/202; 711/216; 711/220
(58) Field of Search ............................... 711/129, 202, 711/216, 220

(56) References Cited

U.S. PATENT DOCUMENTS

| | | | | |
|---|---|---|---|---|
| 5,854,921 A | * | 12/1998 | Pickett | 712/239 |
| 5,875,464 A | * | 2/1999 | Kirk | 711/129 |
| 5,893,145 A | * | 4/1999 | Thayer et al. | 711/125 |
| 5,941,938 A | * | 8/1999 | Thayer | 708/490 |
| 6,154,831 A | * | 11/2000 | Thayer et al. | 712/208 |

* cited by examiner

Primary Examiner—Reba I. Elmore
(74) Attorney, Agent, or Firm—Larsons & Taylor, PLC (57) ABSTRACT

A cache memory (35) has a logical organisation in which its memory space is divided into sub-sections or partitions (P). This permits different data objects to be allocated to different partitions during the operation of the cache memory (35). Commands led used by the cache memory (10) may contain an extra parameter which is used to identify the appropriate partition within the cache memory (35). The parameter is extracted from the command by a decoder (37) and is passed to a specific line of an equator set (38) which contains identifiers which determine the partition to be used. To minimise data collisions for a given partition size, a stride may be defined which expresses the separation of addresses and from which a mapping function can be selected which covers all addresses in the cache memory (35) in an efficient way.

15 Claims, 10 Drawing Sheets

| Partition | Size | Stride | Contains |
|---|---|---|---|
| 0 | 2 | 1 | Scalar partition |
| 1 | 1 | 1 | Partition for d |
| 2 | 1 | 1 | Partition for c |
| 3 | 1 | 1 | Partition for b |
| 4 | 1 | 32 | Partition for b |
| 5 | 1 | 32 | Partition for a |
| 6 | 1 | 1 | Partition for a |

```
        CPART   3, 10, 2, 1
        CPART   4, 12, 2, 3
        CPART   5, 14, 1, 1
LOOP:
        LOAD    r4, [r0], 5
        LOAD    r5, [r1], 4
        ADD     r5, r5, r4
        STORE   r5, [r2], 3
        ADD     r0, r0, #4
        ADD     r1, r1, #48
        ADD     r2, r2, #8
        SUB     r6, r6, #1
        BGT     LOOP
```

FIG. 5b

```
        CPART   3, 0xA81
        CPART   4, 0xC83
        CPART   5, 0x741
LOOP:
        LOAD    r4, [r0], 5
        LOAD    r5, [r1], 4
        ADD     r5, r5, r4
        STORE   r5, [r2], 3
        ADD     r0, r0, #4
        ADD     r1, r1, #48
        ADD     r2, r2, #8
        SUB     r6, r6, #1
        BGT     LOOP
```

FIG. 5c

```
        LDC     r8, 0xA81
        LDC     r9, 0xC83
        LDC     r10, 0x741
LOOP:
        LOAD    r4, [r0], r10
        LOAD    r5, [r1], r9
        ADD     r5, r5, r4
        STORE   r5, [r2], r8
        ADD     r0, r0, #4
        ADD     r1, r1, #48
        ADD     r2, r2, #8
        SUB     r6, r6, #1
        BGT     LOOP
```

FIG. 5d

```
        CPART   r2 0xA81
        CPART   r1, 0xC83
        CPART   r0, 0x741
LOOP:
        LOAD    r4, [r0], r10
        LOAD    r5, [r1], r9
        ADD     r5, r5, r4
        STORE   r5, [r2], r8
        ADD     r0, r0, #4
        ADD     r1, r1, #48
        ADD     r2, r2, #8
        SUB     r6, r6, #1
        BGT     LOOP
```

CACHE MEMORY WITH DATA TRANSFER CONTROL AND METHOD OF OPERATING SAME

BACKGROUND OF THE INVENTION

1. Field of the Invention

The present invention relates to a cache memory and to a method of operating such a cache memory.

2. Summary of the Prior Art

Current computer architectures rely heavily on the use of cache memory (hereinafter "cache"). Integrated with the processor on a single large chip, caches enable the processor to operate at high speed, as most instructions and data can be rapidly accessed from the caches instead of from the main memory which is usually at least ten times slower. On-chip caches have grown steadily in size over the last decade, and now represent a significant proportion of the cost and power consumption of the processor chip. It should be noted that the cache memory is inevitably of smaller memory space than the main memory, but provides more rapid access.

Although it is normally the case that large caches offer better performance than small ones, it is also clear that the performance is not directly related to the size of the cache. Typically, program performance will increase as the cache size increases up to a certain point at which further increases in cache size will have little or no effect. Cache management hardware takes no account of the characteristics of specific programs, and in many simple cases performs very inefficiently. Another common problem is interference, which arises when a program accesses a collection of data objects which compete for parts of the cache. Current approaches to these problems have relied on the use of more complex cache architectures and on increasing cache sizes, with a corresponding increase in system cost, size and power consumption.

SUMMARY OF THE INVENTION

At its most general, the present invention proposed that a chache memory has a logical organization in which its memory space is divided into sub-sections (hereinafter "partions") under the control of a programmer or compiler. The size of the sub-sections need not be fixed, but may be determined by the control oporation.

This permits data objects to be allocated to particular partitions of the cache. This partitioning of the cache improves the performance of the cache such that a small cache memory can provide the same performance as a conventional cache memory many times larger. This is useful because small caches are faster, take less chip space and less power.

In addition, by minimizing or eliminating interference, the performance of the cache and hence the program can be made more predictable.

In a first alternative, the partition to or from which data items are transferred is controlled by a parameter within an instruction such as a load or store instruction. The parameter may be different for different commands so that data items for different commands made are of different partitions.

Thus, in a first aspect, the present invention may provide a method of operating a cache memory, using commands which cause a transfer, of corresponding items of data between the cache memory and a main memory, which commands have an instruction component and an address component, the method comprising:

defining a plurality of sub-sections within the memory space of the cache memory, each of which has an associated identifier, the sizes of the sub-sections being selectable from a range of sizes during the operation of the cache memory;

extracting from the instruction component of a command a parameter corresponding toga selected one of the identifiers, the corresponding parameter being different for different commands; and transferring items of data corresponding to said command between the main memory and the sub-section of the memory space of the cache memory for which the associated identifier corresponds to the parameter of said command.

However, if registers are associated with instructions such as load or store, with a specific instruction being a corresponding register, then the parameter which determines the partition to or from which data items are transferred may be determined by such registers themselves.

Thus, in a second aspect, the present invention may provide a method of operating a cache memory, using commands which causes a transfer, of corresponding items of data between the cache memory and a main memory, at least some of which commands each have a corresponding register connected to a communication bus for use by said commands, the corresponding register being different for different commands, the method comprising:

defining a plurality of sub-sections within the memory space of the cache memory, each of which has an associated identifier, the sizes of the sub-sections being selectable from a range of sizes during the operation of the cache memory;

associating a parameter with each said corresponding register, each said parameter corresponding to a selected one of the identifiers; and transferring items of data corresponding to said command between the main memory and the sub-section of the memory space of the cache memory for which the associated identifier corresponds to the parameter of the register corresponding to said command.

Another possibility for allocating data objects to particular partitions of the cache arises when a DMA controller is being used. Such a DMA controller generates specific commands for the memory access controlled by the DMA controller. Since the DMA controller generates those commands, it may also control the partition to or from which data items associated with those commands are transferred. Thus, in this case, the parameter which identifies the appropriate partition is not derived from the instruction, or a register associated with the instruction, but instead the command and its associated parameter are generated by a common trigger from the DMA controller.

Thus, in a third aspect, the present invention may provide a method of operating a cache memory under control of a DMA controller, the DMA controller being arranged to generate predetermined commands, the method comprising:

defining a plurality of sub-sections within the memory space of the cache memory, each of which has an associated identifier;

generating, at said DMA controller, one of said predetermined commands and a parameter associated with said one of said predetermined commands and with a selected one of the identifiers; and transferring items of data corresponding to said one of said predetermined commands between a main memory and the sub-section of the memory space of the cache memory for which the associated identifier corresponds to the parameter of said one of said predetermined commands.

Preferably, the programmer or compiler is able to control the size of each partition. That permits analysis of the pattern of access to the cache, and division of the cache into suitably sized partitions, along with the derivation of an appropriate mapping function to map memory addresses to addresses of lines in the partition. Once that has happened, the mapping function should be able to map items in a data structure which marked specification paragraphs are accessed in sequence onto different lines within a partition which the compiler uses for that structure. The aim is then to minimize data collisions for a given partition size. To do this, it is preferable to derive from the program a quantity hereafter referred to as a "stride", the value of which defines the separation of the addresses within the address space of the main memory of successive accesses to or from the memory. Based on the stride, a mapping function can be selected that generates addresses which cover all addresses within a cache partition in an efficient way.

Thus, in a fourth aspect, the present invention may provide a method of operating a cache memory, comprising:

defining a plurality of sub-sections within the memory space of the cache memory; and transferring data items associated with each other only to a corresponding sub-section of the memory space of the cache memory;

wherein each sub-section has a stride associated therewith, the stride representing the separation within the memory addresses of a main memory of successive transfers of data between the corresponding sub-section and the main memory.

In each of the above four aspects, the present invention may also provide a memory system arranged to operate as discussed above.

It should be noted that although such control of the partitioning is preferable, a general purpose function may be needed to perform mapping, if e.g the pattern of access to the data is not known to the compiler. Preferably, the compiler controls the partitioning of the cache memory using a parameter added to a load and store instruction. That partition parameter may be derived from the instruction opcode or from one or more registers. Each of these registers may be a general purpose register, or may be one or more dedicated partition registers. Registers that are used to implicitly access memory, eg via stack pointer or program counter, normally will have a dedicated partition register associated with them.

It is usually desirable that there are functions which identify the line of cache memory from the memory address, and in this case it is preferable that each partition has its own function. The function may for example be a shift and modulo operation.

As has been mentioned above, the stride defines the separation of successive accesses to the memory, for each partition. It should be noted that multiple partitions may be used to cache accesses with different strides to the same data object.

With the present invention it is possible for multiple DMA controllers and a processor to use a common cache, by providing a dedicated partition register in each controller so that the different controllers and the processor all access different partitions.

BRIEF DESCRIPTION OF THE DRAWINGS

An embodiment of the present invention will now be described in detail, by way of example, with reference to the accompanying drawings, in which:

FIG. 8 is a diagram showing the relation between FIGS. 8A and 8B, while FIGS. 8A and 8B, taken together, are a schematic block diagram of a further arrangement of a memory structure usable in the present invention.

DETAILED DESCRIPTION

Figure 1A:
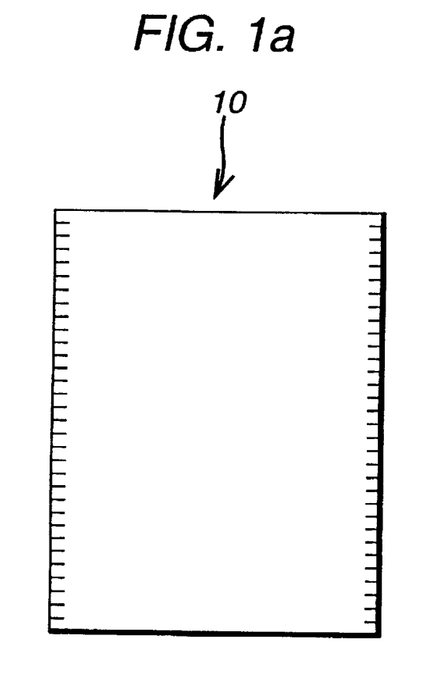
FIGS. 1a to 1c show a cache memory according to the present invention, which is dividable into partitions.
Figure 1B:
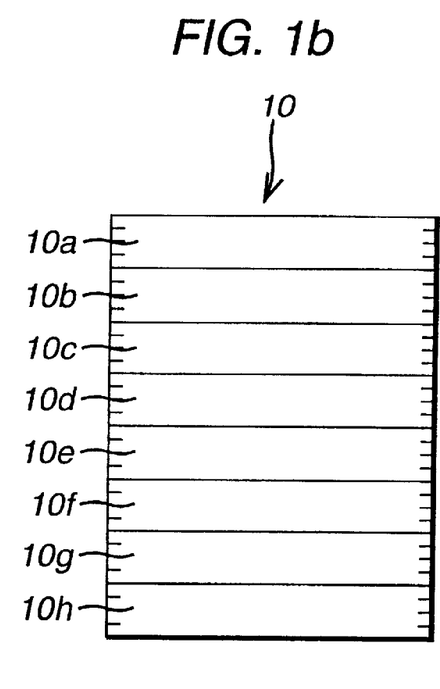
Figure 1C:
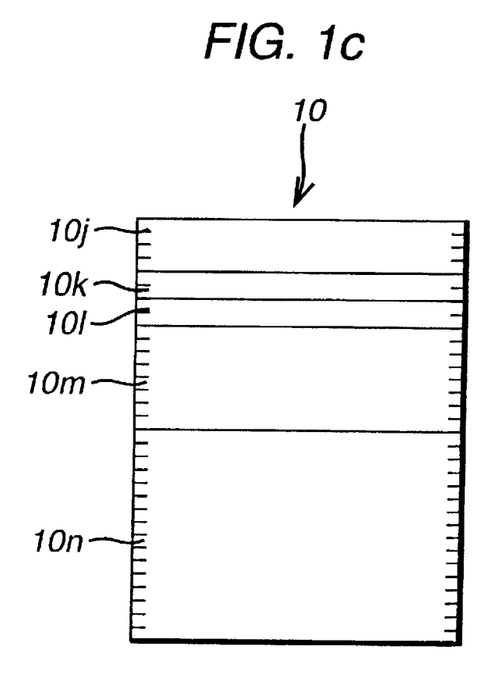

Consider a cache memory (cache) with $2^p$ lines, each line being able to store items in a data structure. FIG. 1a shows such a cache 10 where n is 5, so that there are 32 lines. Such a cache 10 can be divided into $2_p$ partitions each of size $2^{(n-p)}$ lines. It can also be divided into partitions of size $2^{(n-x)}$ where $\chi<p$, or into any combination of different size partitions. Each partition P has an address Pa which corresponds to the address of the first line in the partition, so that an address a within partition P has an address formed by carrying out a bitwise OR operation on Pa and a. The address of the line to be used within the partition must, of course, be derived from the memory address used to load or store data. Thus, FIG. 1b shows the cache of FIG. 1a divided into 8 partitions 10a to 10h of equal size, and FIG. 1c shows the same cache 10 divided into unequal partitions 10j to 10n.

In such an arrangement, a program produced by a compiler or programmer must be able to pass information to the hardware of the cache. In an embodiment of the present invention, it is proposed that an extra parameter be added to the load and store instructions which control the cache memory. This extra partition parameter supplies the partition information for operation of the cache. This will be discussed in more detail subsequently.

However, it should be noted that there are two alternatives which do not require the instruction set to be modified. It is possible to use the high order bits of the address space to contain the partition information, or alternatively it is possible to store the "current partition information" in the cache, and change this partition information as and when required. The last solution is only of use when it is expected that a series of multiple requests will be sent through the same partition. Using higher order address bits is particularly useful when a cache according to the present invention is to be used marked specification paragraphs together with an existing processor core. It is also suitable for languages like C, where the partition information will be carried along implicitly with a pointer.

Figures 2A, 2B, 4:
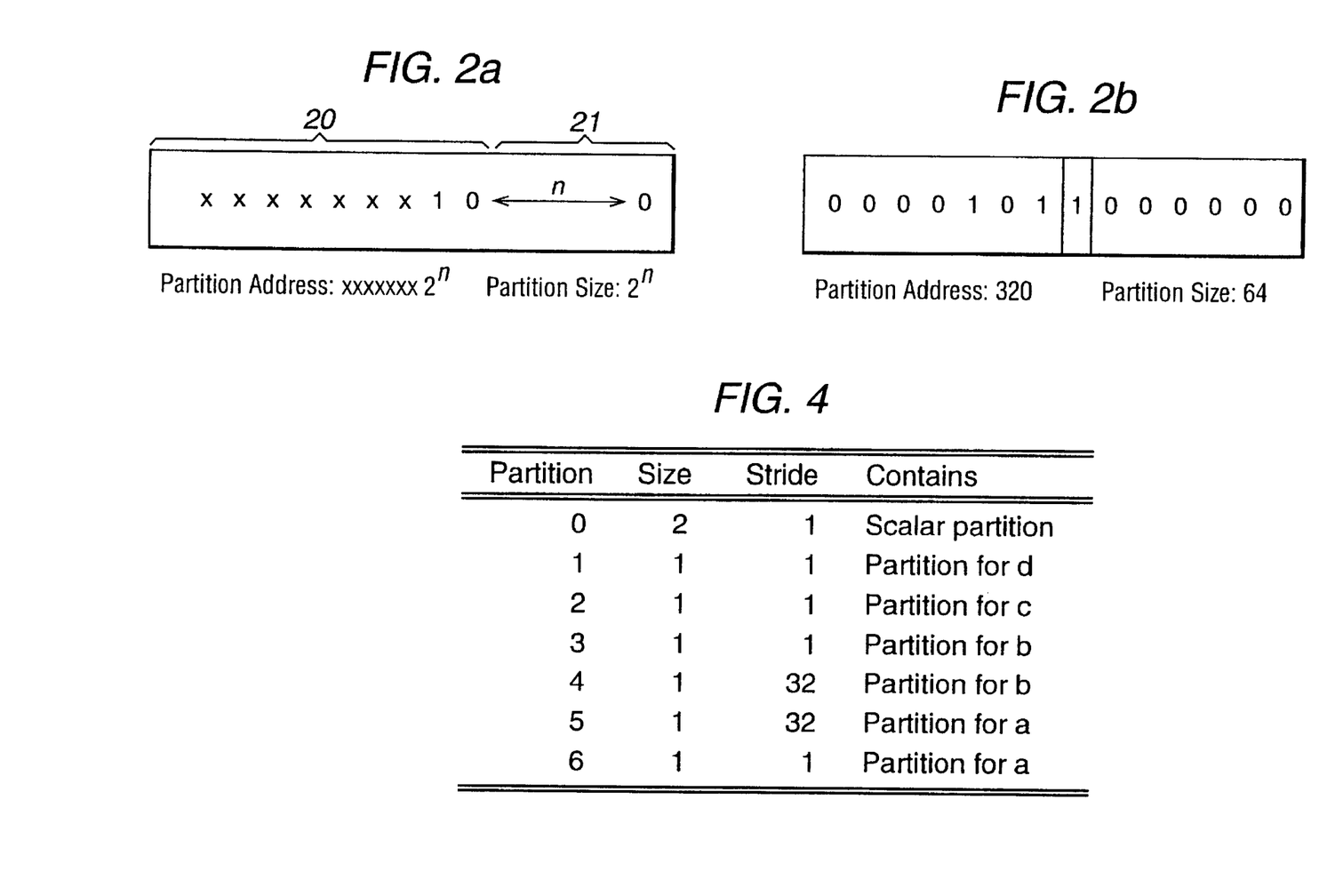
FIGS. 2a and 2b show the structure of the partition information.
FIG. 4 is a table showing partitions which may be used by a specific program in an embodiment of the present invention.

The structure of the partition information also needs to be considered. A simple method is to use a number as the partition operand and to use this number to select one of a set of partition control registers holding partition identifiers and mapping information. The partition identifier can be represented by the partition address and partition size. A more complicated but more elegant scheme is to use a bit-pattern in which the position of the rightmost "one" bit defines the size of the partition and the leftmost bits define the address of the partition within the cache. This is depicted in FIGS. 2a and 2b, in which FIG. 2a shows a general case of division into a partition address 20 and a partition size 21, shows a specific case. The mapping information defines how to hash the address in the partition. In our simple scheme, this information consists of the shift length, but a more complicated scheme might require an XOR of some parts of the address.

One possible scheme currently preferred is to use numbered partitions, and pass an extra parameter with instructions accessing the memory. Assuming a normal RISC load/store architecture, the instructions affected are the load and store instructions. For our example we have LOAD and STORE that offer indirect load and store operations. Each of these instructions requires an extra parameter (compared with a normal RISC load/store), which indicates the partition number in the cache. It would of course be possible to include other instructions such as indexed loads and stores.

We create partitions using a CPART instruction. The CPART instruction takes 3 parameters, a partition number, a number of lines and a stride. The partition number is the name that will be used in the load and store instructions. The number of lines (currently we restrict this to powers of two) is the size of the partition, and the shift indicates the shift which should be applied to the memory address before it is used to access this partition.

The implementation of such a partitioned cache can be based on a conventional direct map cache memory. A block diagram of one arrangement of a suitable structure is shown in FIG. 3.

In a conventional memory structure, a command to transfer data between a memory and, for example, a register for subsequent use includes an address component, and an opcode. Examples of such commands are load commands which retrieve data from a specified address in a memory, and store commands which store data at a specified address in a memory. As shown in FIG. 3, the address and data are normally carried by two separate busses 31, 32, one 31 of which carries data including an instruction component of the command and the other 32 of which carries the address. Signals to and from those buses 31, 32 may pass via a register bank 33, and from there to an arithmetic logic unit (ALU) 34.

In the present invention, however, the instructions on bus 31 contain an extra parameter which is used to identify the appropriate partition within a cache memory 35. Such an instruction is then passed via a buffer 36 to a decoder 37 which extracts from the instruction the parameter, which is output from the decoder 37 as a partition number. That partition number is then passed to a register set 38 which contains partition information.

Figure 3:
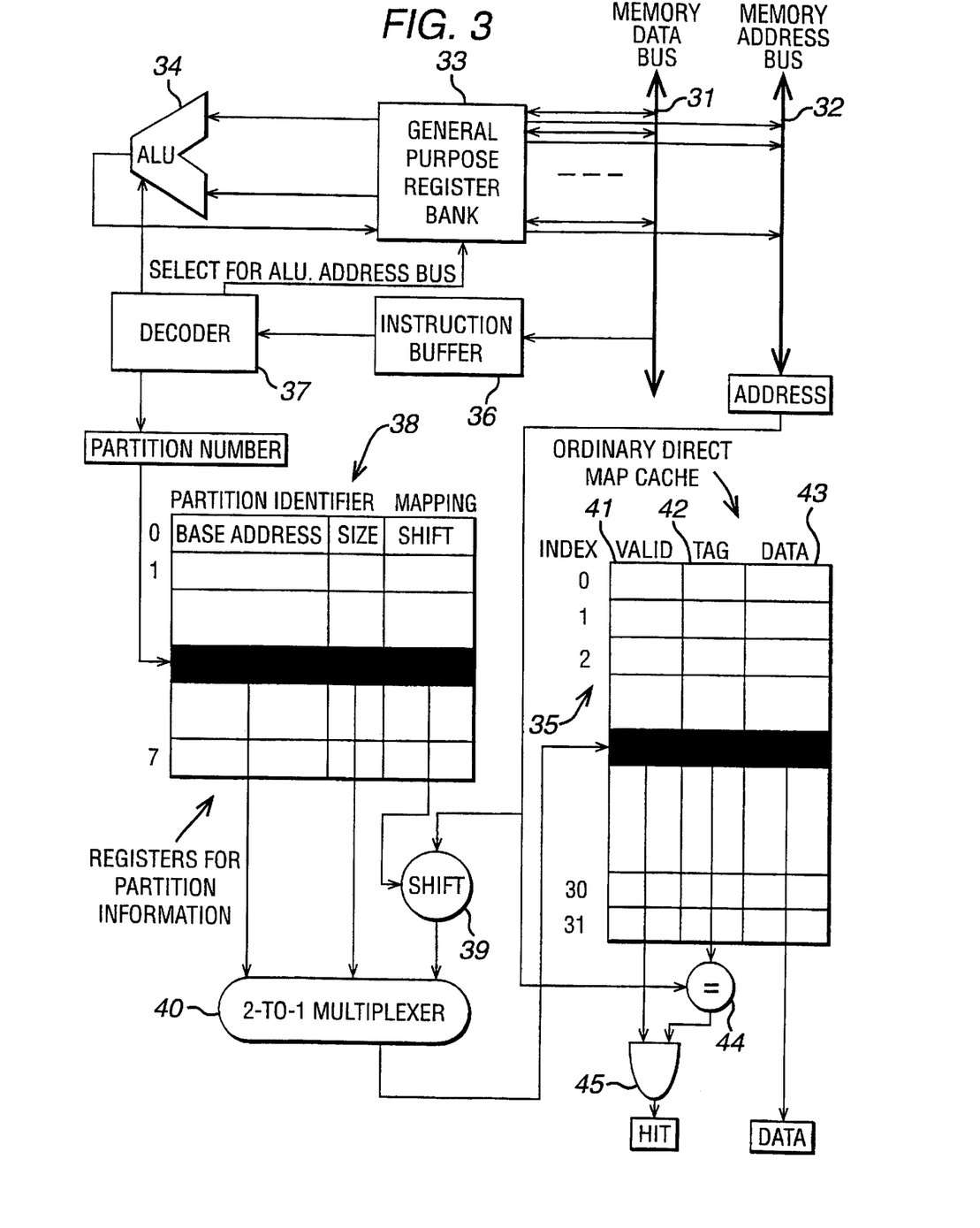
FIG. 3 is a schematic block diagram of one arrangement of a memory structure usable in the present invention.

As shown in FIG. 3, that register set 38 contains identifiers as described with reference to FIGS. 2A and 2B, identifying a base address, a size and a shift. The partition number output from the decoder 37 identifies a specific line within the register set 38, to output a partition base address, size and shift. The latter is used to perform a shift on the address derived from the address buss 32 to a shifter 39, the output of which is fed to a multiplexer 40.

The multiplexer also receives the partition identifier from the register set 38, being the base address and size of the partition identified by the partition number from decoder 37. The output of the multiplexer then identifies the appropriate line of the cache 35. The cache 35 is a direct map cache, with each line divided into a validity bit or bits 41, tag bits 42 and data bits 43. When the signal from the multiplexer 40 identifies a line in the cache 35, the tag 42 is output to a comparator 44, which compares the tag with the address from the address bus 32. If equality is found, an output is sent to an AND gate 45, which also received an input from the validity bit 41. The logical AND operation then confirms that the appropriate line has been identified, and the data 43 can then be read.

In such an embodiment, the addressing of the partition control registers can be pipelined with the execution of the load/store instruction if we assume that the partition operand is a constant parameter of the load and store instructions. Also, the partition control registers can simply be general purpose registers.

The partition control register set can be very small indeed. Normally one register is needed for each partition. The base address and select bits can be stored in $\log_2 l$ bits where l is the number of lines in the cache. These may be combined in one word of size $1+\log_2 l$ bits if the encoding presented earlier is to be used. Finally, the shift needs to be stored in at most 6 bits for 64 bit address machines.

In this embodiment, suppose that the compiler takes a program which uses scalars and (multi dimensional) arrays, and generates instructions which include all the partitioning information. The compiler may then calculate the minimally required partition sizes, and analyze all accesses in order to optimize persistence (the length of time each value remains) in each of the partitions.

The "stride" of a reference is the distance between addresses of successive accesses to an array variable.

For example, int i, j, k;
int cTemp, dTemp;
int [32, 32] a;
int [32, 32] b;
int [32, 32] c;
int [32, 32] d;

is a set of variable declarations for variables a, b, i, j and k, and for i=0 to 31 {
  for j=0 to 31 {
    cTemp=0;
    dTemp=0;
    for k=0 t 31 {
      cTemp=cTemp+(a[k,i]*b[i,k]):
      dTemp=dTemp+(b[k,i]*i,k)
    c[i,j]=cTemp;
    d[i,j]=dTemp;
  }
} is a sequence of statements, which calculates AB and BA for two matrices A and B in matrices C and D. All matrices are stored in two dimensional arrays of size 32 by 32, which are stored as sequences of 1024 values. The first value denotes element a[0,0], the second value element a[a,1], . . . . , the 32-nd value is element a[0,31], the 33-rd value is element a[1,0] and so on until the 1024th value which is a[31,31]. Note that a[0,0] and a[0,1] are one memory cell apart, while a[0,0] and a[1,0] are 32 memory cells apart.

In general, we can handle any indexed variable where the index is of the form $c_0 k + c_1$. Here $c_0$ and $c_1$ are constants and k is the loop counter. In the line dtemp=dtemp+b [k,i]*a[i,k]

a has stride 1 and b has stride 32.

Suppose that an array is to be accessed repeatedly within a loop with a stride s, by which it is meant that successive accesses are to elements s apart. By extracting bits from the addresses used, starting at the bit position defined by the least significant 1-bit of s, line addresses can be generated which will change with each iteration of the loop, distributing the data accessed by successive iterations among the lines within the cache partition.

To see that this will in fact distribute the data optimally, consider a stride s. If we ignore all trailing zeros of s are ignored, a stride s' is obtained which must be odd. The stride s' is either 1 or is co-prime with any power of 2. Therefore, $kxs'$ mod $2^c$ (k=0,1,2, . . . ; c) will traverse all numbers between 0 and $2^c-1$. Hence all strides s use every line in the partition before reusing any of them. The partition size will therefore define the persistence of data within the cache.

For example, if the array which is accessed with a stride of 20, (binary 10100) then a shift down by two bits may be used to map array addresses to line addresses within the partition used for the array accesses. If the size of the partition is 8, then subsequent items will be placed at line addresses 0,5,2,7,4,1,6,3,0,5, . . . . The persistence of data is 8 in this case; if this is not enough, it may be necessary to increase the partition size.

In this embodiment, the compiler may create one special partition for the scalars, and then one partition for every group of accesses to an array which have identical strides. The scalar partition assumes that scalars are placed contiguously in memory, and start at a cache line boundary. The number of lines allocated to the scalar partition is determined by the number of scalars. By default a partition is allocated which is large enough to hold all the scalars. In the example above there are 5 scalars. The cache has 4 words per line. Hence, a two line partition is allocated for the scalars with the instruction

CPART 0, 2, 1

All scalar references are then marked to use partition 0 when loading and storing.

For all groups of non scalar references, a unique partition is created. The size of this partition depends on the mapping function that the cache uses to access elements in the partition and on the required persistence.

The mapping function used selects the line in the partition by taking all bits from the access address starting from the position of the least significant 1 bit n the stride (as defined previously). The compiler locates partition sizes large enough to keep each data item in the partition until it is no longer needed.

In the example above, the complete partition summary is contained in the table in FIG. 4. Note that the total cache size allocated for this is 8 cache lines, spread over 7 partitions.

Figure 5A:
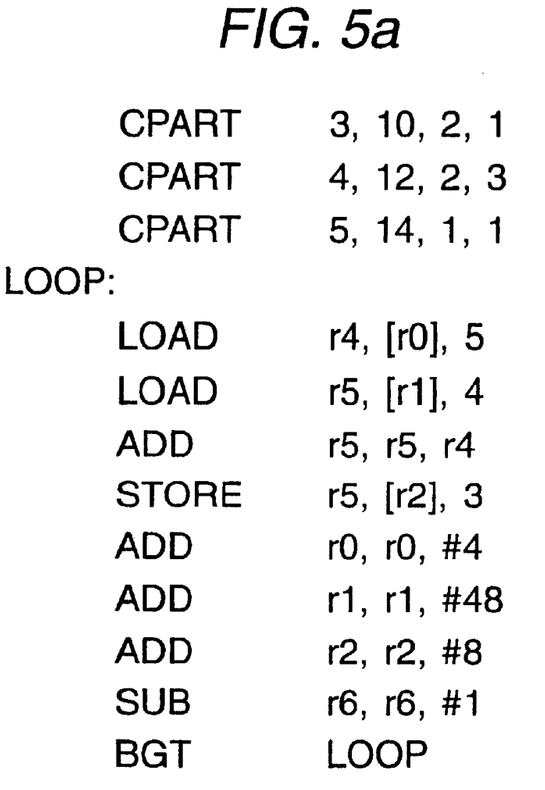
FIGS. 5a to 5d are computer code fragments for controlling a partitioned cache.
Figure 5B:
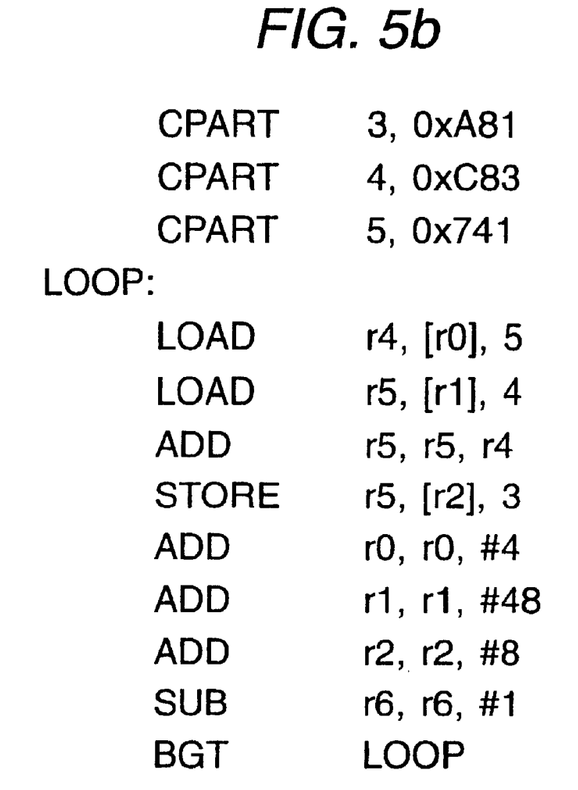
Figure 5C:
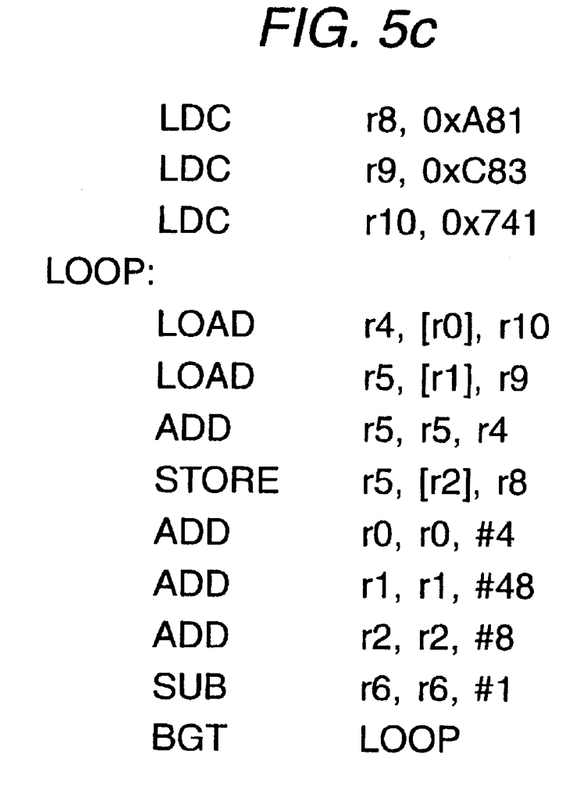

Various possibilities for controlling a cache memory according to the present invention by software are as illustrated in FIGS. 5a to 5c. In those arrangements, the code fragments will perform a vector addition, with the vectors being stored with different strides for illustrative purposes.

In the first code fragment of FIG. 5a, the semantics of the instructions are as follows:

CPART p,b,l,s This instruction creates partition number p. The partition starts at line b in the cache, and consists of 1 lines. The last parameter indicates the shift value, the base address will be shifted by s before indexing the direct mapped cache.

LOAD d, [s],p This instruction loads the contents of the memory address pointed to by s into d, where s and d are general purpose registers. In this example we have restricted ourselves to indirect loads via a register, but this could be any addressing mode.

The third parameter is the partition number via which the load should be performed. The partition should be defined with the CPART instructions before using it in a load.

STORE d, [s],p This instruction stores d in the memory address pointed to by s, where s and d are general purpose registers. In this example we have restricted ourselves to indirect loads via a register, but this could be any addressing mode. The third parameter is the partition number via which the load should be performed. The partition should be defined with the CPART instruction before using it in a load ADD,SUB,BGT perform addition, subtraction and a conditional branch, similar to conventional processors. Only load and store instructions need an extra parameter.

In the second code fragment shown in FIG. 5b the CPART instruction has a different semantics:

CPART p,i This instruction creates partition number p.

The base address, size and shift are all mapped into a single number. The last six bits of this number are the shift (a number between 0 and 63), the bits before that are encoded using the scheme discussed in FIG. 2.

Figure 6:
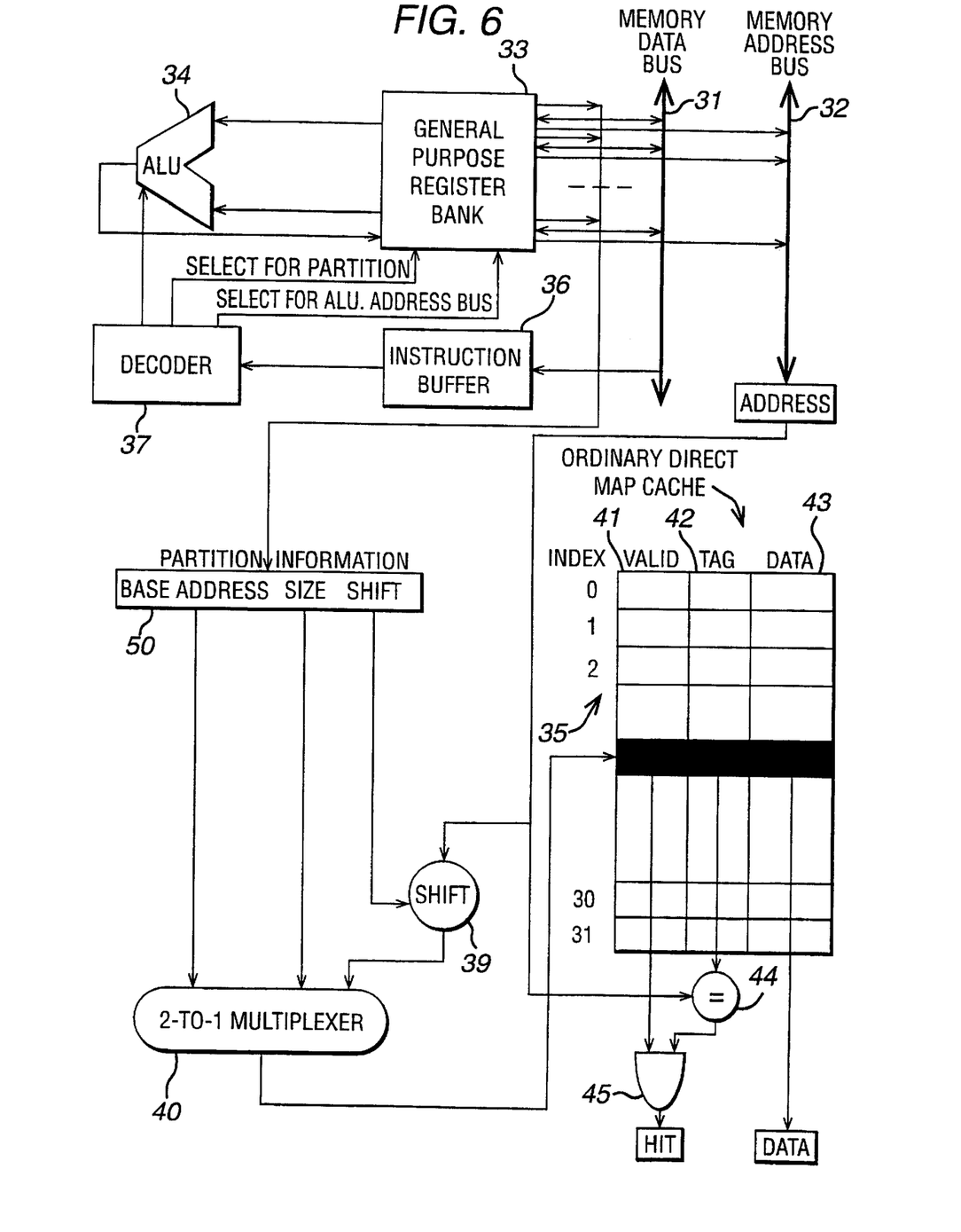
FIG. 6 is a schematic block diagram of another arrangement of a memory structure usable in the present invention.

The code fragments described with reference to FIGS. 5A and 5B are used with the memory structure of FIG. 3, in which there is a register set 38 which stores cache partition information. FIG. 6 illustrates a modification of the memory structure of FIG. 3. In FIG. 6, components which correspond to the components in FIG. 3 are indicated by the same reference numbers. In FIG. 6, however, the partition information derived by decoder 37 from the instructions received from instruction buffer 36 are passed to the register bank 33 in which the partition and shift information is stored. Storage in the register bank 33 may otherwise be the same as in FIG. 3. Thus, the register bank 33 outputs partition information 50 containing a base address, size and shift which are passed to the multiplexer 40 and shifter 39 respectively. The arrangement of FIG. 6 is then otherwise the same as that of FIG. 3. However, the commands needed are then changed, and the code fragment for this is illustrated in FIG. 5C.

Thus, in a third code fragment shown in FIG. 5C conventional registers are used instead of partition registers. Three conventional registers are loaded with the partition address, size, and shift, and these registers are used as the partition operands of the load and store operations. The third parameter of the load and store is now a register parameter:

LOAD d, [s],p the contents of the partition register associated with the register S determines the base address, size and the shift information for the partition.

STORE d, [s],p the contents of the partition register associated with the register S determine the base address, size and the shift information for the partition.

Figure 5D:
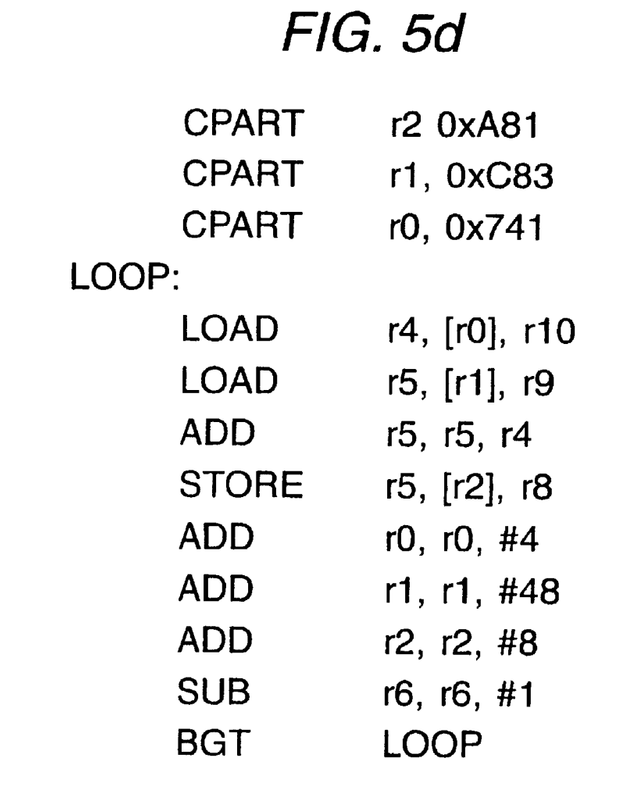
Figure 7:
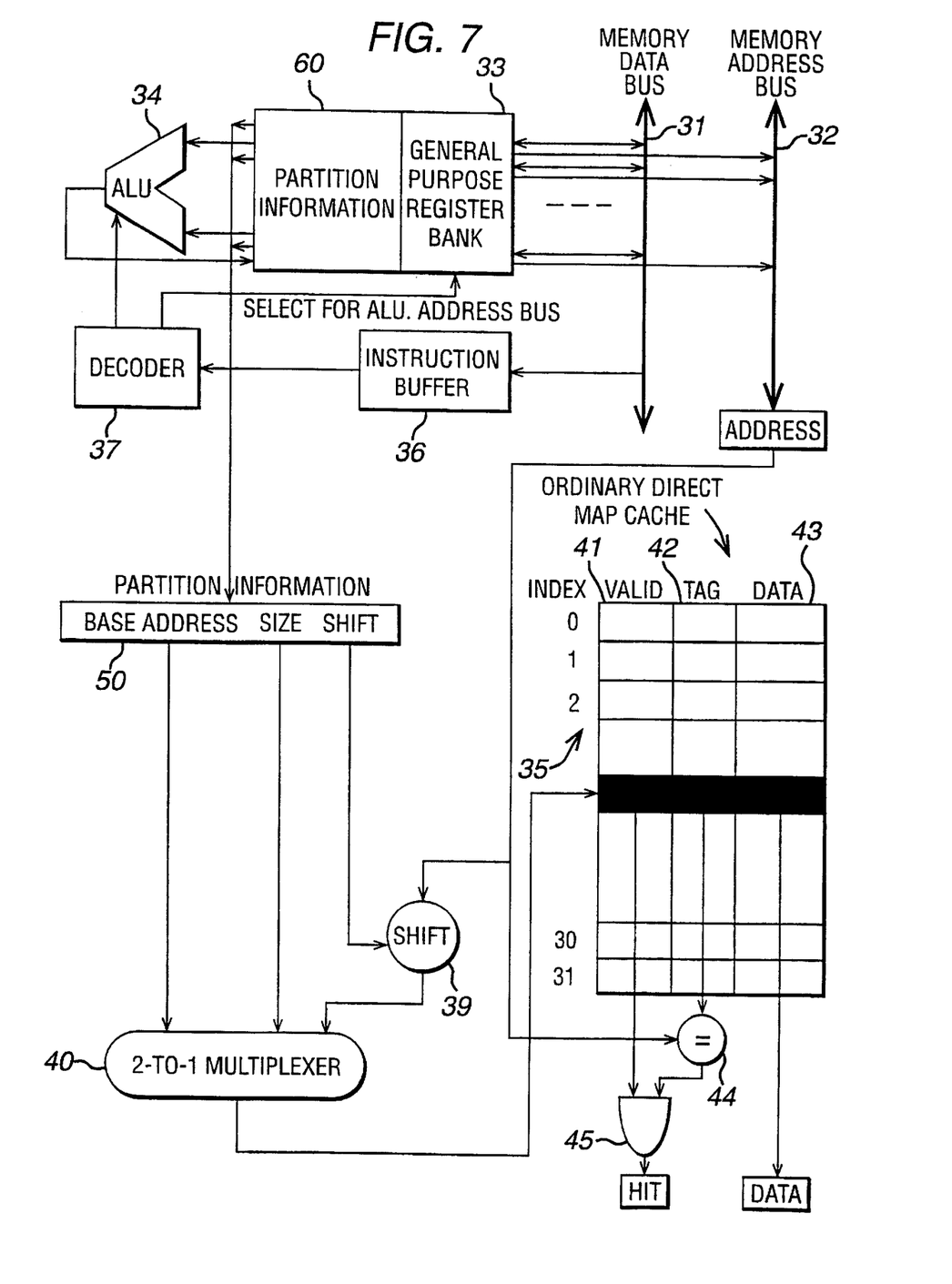
FIG. 7 is a schematic block diagram of yet another arrangement of a memory structure usable in the present invention.

FIG. 7 shows another alternative, in which partition registers 60 are associated directly with the register bank 33 contain the partition and shift information. Again, the components in FIG. 7 which are the same as those in FIGS. 3 and 6 are indicated by the same reference numerals. The code fragment in such an arrangement is illustrated in FIG. 5d.

LOAD d, [s],p p is a register, the contents of which determine the base address, size and the shift information for the partition.

STORE d, [s],p p is a register, the contents of which determine the base address, size and the shift information for the partition.

Figure 8:
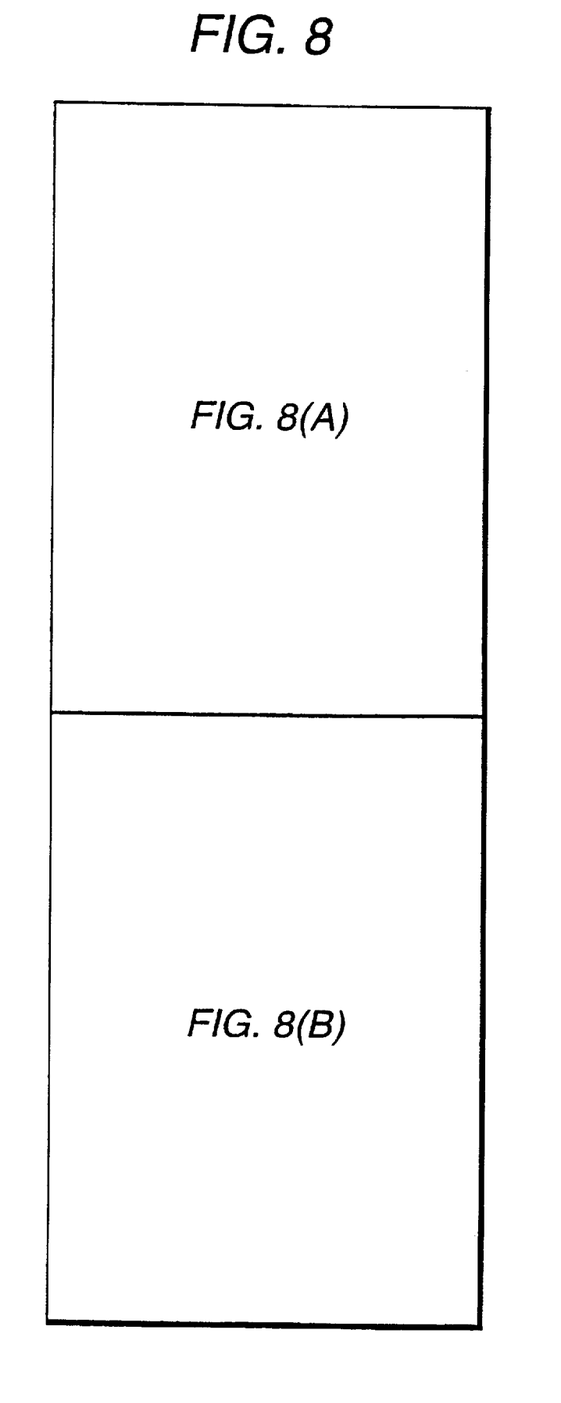
Figure 8A:
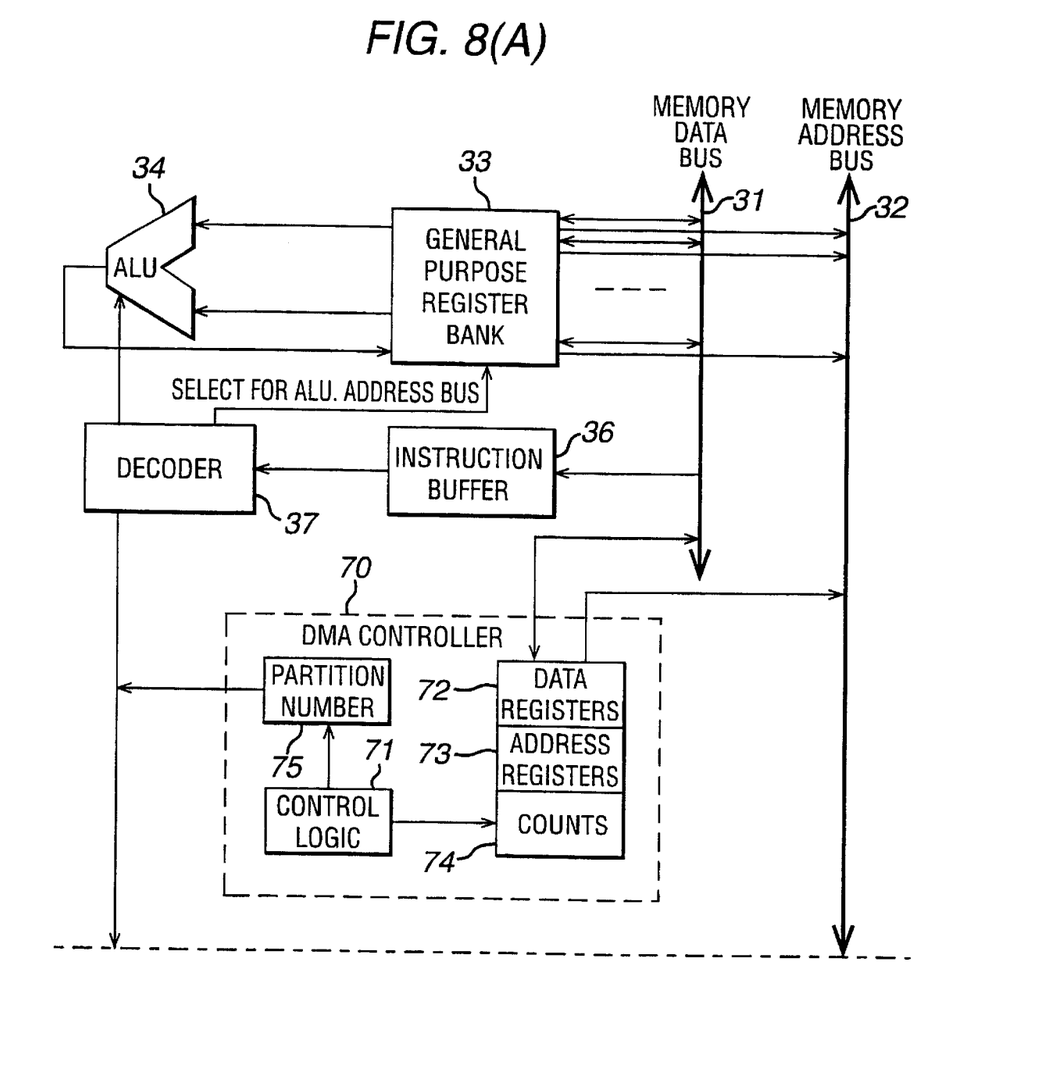
Figure 8B:
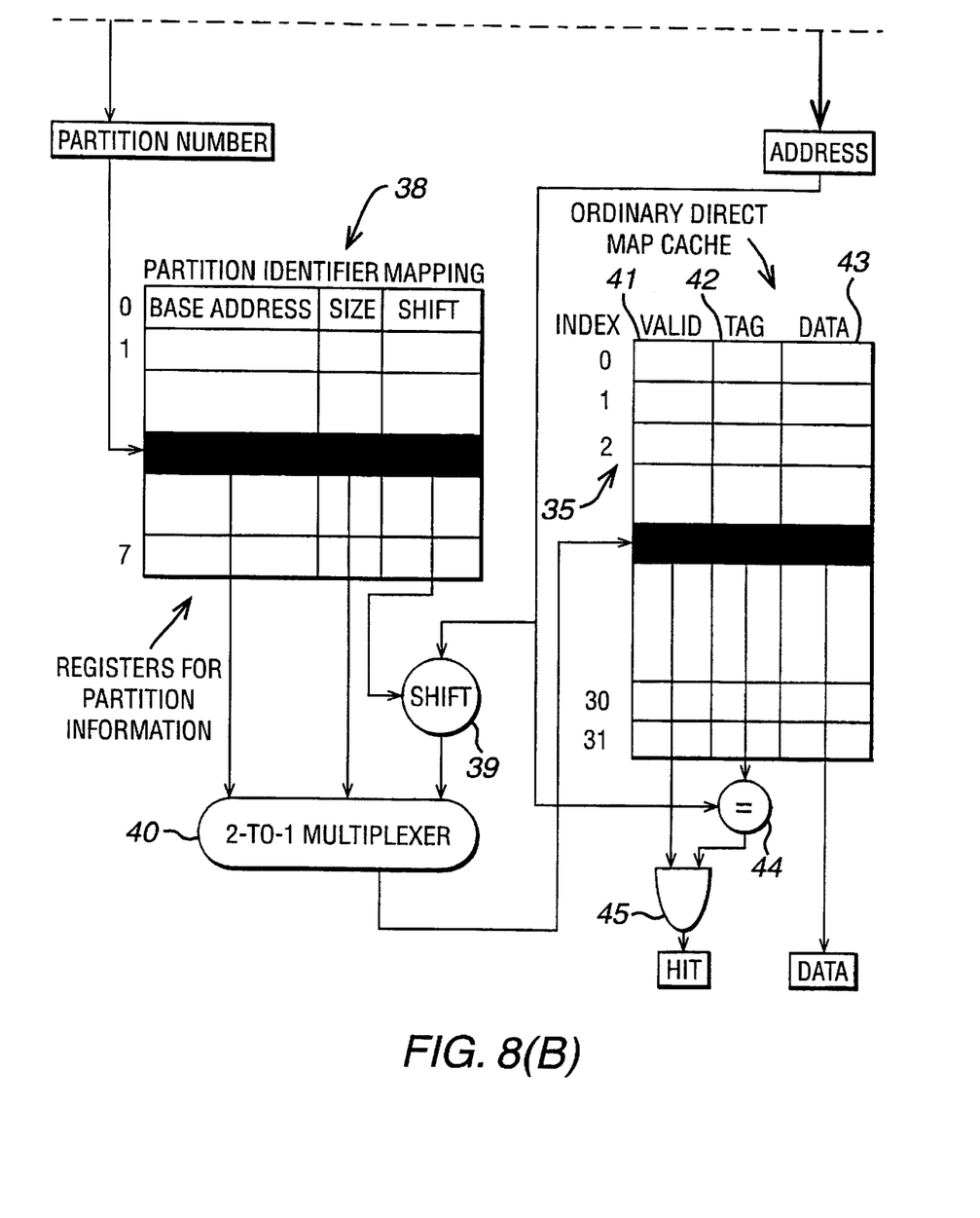

FIGS. 8A and 8B show a further alternative, which is applicable when a DMA controller 70 is to access the cache 35. The rest of the structure of FIGS. 8A and 8B is the same as that in FIG. 3, and corresponding parts are indicated by the same reference numerals.

When the DMA controller 70 operates, it generates commands which are transmitted via the busses 31, 32. As shown in FIG. 8, the DMA controller 70 has a control logic unit 71 which signals to data registers 72, address registers 73 and counters 74 to generate such commands. The data for the commands from the data register 72 are passed to the bus 31, and the corresponding addresses is from the address register 73 to the bus 32. Since the DMA controller 70 generates such commands, it is possible for the DMA controller 70 directly to determine which partition of the cache 35 needs to receive or output data for each command generated by the DMA controller 70. Therefore, the control logic unit 71 may, at the same time as it triggers a command, may cause a partition number unit 75 to output data representing a partition number, which is sent to the register set 38. Once the partition number has thus been supplied, access to or from the cache 35 occurs in the same as in FIG. 3.

It can be noted that, in such an arrangement, it is possible that only some of the partitions of the cache 35 are operated under the controller of the DMA controller 70. Then, other partitions may be accessed from commands on the busses 31, 32, via the instruction buffer 36 and the decoder 37, as in the arrangement of FIG. 3.

Investigations have shown that a partitioned cache in accordance with the present invention can achieve results comparable with larger caches of known configuration. Because a cache according to the present invention is physically smaller, the cost of production is reduced. Also, there may be more physical space available for other associated electronic components in spatially restricted devices. A further advantage is that, because a cache according the present invention may be smaller than an equivalent conventional cache, it may consume less power.

It is possible to implement a partitioned cache according to the present invention in several ways. The embodiment of FIG. 3 uses a direct mapped cache, which conventionally is built from memory elements that are faster and more expensive than main memory. Because, for equivalent functionality, a cache according to the present invention may be smaller, it may be implemented using even faster, register style memory devices. This means that even when the overall hit ratio of a cache according to the present invention is lower than known caches, the disadvantage is not significant because of the improvement in speed of access to the cache which is gained by using register style memory.

Because the present invention permits various activities to be kept in different partitions of the cache, the performance of a partition is independent of other partitions. The is may be important for, e.g., audio and video applications. Moreover, predictability of performance is improved, because performance of the system is directly related to the performance of its constituent parts, namely the partitions. In the conventional cache memory, an attempt to combine two functions is a program may lead to faulty results.

In a conventional cache, data items dynamically compete for space. Using a cache partition according to the present invention, a compiler can allocate data items to independent partitions, and thus the compiler has control over cache allocation in same way it has control over register allocation.

What is claimed is:

1. A method of operating a cache memory, using commands which cause a transfer, of corresponding items of data between the cache memory and a main memory, which commands have an instruction component and an address component, the method comprising:

defining a plurality of sub-sections within the memory space of the cache memory, each of which has an associated identifier, the sizes of the sub-sections being selectable from a range of sizes during the operation of the cache memory, the size of each subsection being identified by the associated identifier;

extracting from the instruction component of a command a parameter corresponding to a selected one of the identifiers, the corresponding parameter being different for different commands;

and transferring items of data corresponding to said command between the main memory and the sub-section of the memory space of the cache memory for which the associated identifier corresponds to the parameter of said command.

2. A method according to claim 1, wherein each subsection of the memory space of the cache memory has a predetermined rule defining in which line of the corresponding sub-section successive items of data are stored, which predetermined rule makes use of the address component of said command.

3. A method according to claim 2, wherein each predetermined rule is a shift and select operation.

4. A method according to claim 1, wherein each sub-section has a stride associated therewith, the stride representing the separation within the memory addresses of the main memory of successive transfers of data between the corresponding sub-section and the main memory.

5. A method according to claim 4, wherein the lowest 1-bit in said stride determines the shift applied to the memory addresses of the main memory to determine the location within the corresponding sub-sections.

6. A method according to claim 1, wherein each parameter identifies one of a set of registers, each of which contains data which identifies the sub-section for which the associated identifier corresponds to that parameter.

7. A method according to claim 6, wherein the address and/or the parameter of said commands are stored in general purpose registers.

8. A method according to claim 7, wherein the set of registers and the general purpose registers form a common unit.

9. A method according to claim 1, wherein each parameter represents data which identifies the sub-section for which the associated identifier corresponds to that parameter.

10. A method of operating a cache memory, using commands which cause a transfer of corresponding items of data between the cache memory and a main memory, at least some of which commands each have a corresponding register connected to a communication bus for use by said commands, the corresponding register being different for different commands, the method comprising:

defining a plurality of sub-sections within the memory space of the cache memory, each of which has an associated identifier, the sizes of the sub-sections being selectable from a range of sizes during the operation of the cache memory;

associating a parameter with each said corresponding register, each said parameter corresponding to a selected one of the identifiers; and transferring items of data corresponding to said command between the main memory and the sub-section of the memory space of the cache memory for which the associated identifier corresponds to the parameter of the register corresponding to said command.

11. A method of operating a cache memory under control of a DMA controller, the DMA controller being arranged to generate predetermined commands, the method comprising:

defining a plurality of sub-sections within the memory space of the cache memory, each of which has an associated identifier;

generating, at said DMA controller, one of said predetermined commands and a parameter associated with said one of said predetermined commands and with a selected one of the identifiers; and transferring items of data corresponding to said one of said predetermined commands between a main memory and the sub-section of the memory space of the cache memory for which the associated identifier corresponds to the parameter of said one of said predetermined commands.

12. A method of operating a cache memory, comprising:

defining a plurality of sub-sections within the memory space of the cache memory; and transferring data items associated with each other only to a corresponding sub-section of the memory space of the cache memory;

wherein each sub-section has a stride associated therewith, the stride representing the separation within the memory addresses off a main memory of successive transfers of data between the corresponding sub-section and the main memory.

13. A memory system comprising a main memory and a cache memory, the memory space of the cache memory being divided into a plurality of sub-sections, each subsection having a corresponding identifier, the sizes of the sub-sections being selectable from a range of sizes during the operation of the cache memory, the size of each sub-section being identified by the associated identifier;

instruction and address buses respectively for instruction components and address components of commands which cause a transfer of data between the cache memory and the main memory;

means for extracting from the instruction component of a command a parameter-corresponding to a selected one of the identifiers, the corresponding parameter being different for different commands; and means for controlling the transfer of data to and from the cache memory, such that data corresponding to a command is transferred between the main memory and the sub-section of the memory space of the cache memory for which the associated identifier corresponds to the parameter of said command.

14. A memory system comprising a main memory and a cache memory, the memory space of the cache memory being divided into a plurality of sub-sections, each subsection having a corresponding identifier, the sizes of the sub-sections being selectable from a range of sizes during the operation of the cache memory;

instruction and address buses respectively for instruction components and address components of commands which cause a transfer of data between the cache memory and the main memory;

registers connected to said address bus, each of said registers being for a corresponding-command, the corresponding register being different for different commands;

a parameter associated with each said register, each parameter corresponding to a selected one of the identifiers; and means for controlling the transfer of data to and from the cache memory such that data corresponding to a command is transferred between the main memory and the sub-section of the memory space of the cache memory for which the associated identifier corresponds to the parameter of the register corresponding to said command.

15. A memory system comprising:

a main memory;

a cache memory, the memory space of which is divided into a plurality of sections, each sub-section having a corresponding identifier;

a DMA controller having means for generating predetermined commands which commands involve transfer of data to or from the cache memory, and means for generating parameters corresponding to at least one of said identifiers, said parameters also being associated with said commands such that each command has an associated parameter; and means for controlling the transfer of data between the cache memory and the main memory such that data corresponding to a command is transferred to or from the sub-section of the memory space of the cache memory for which the associated identifier corresponds to the parameter of said command.

* * * * *